July 6, 1965
J. E. LANGAN
3,193,748
PILOT SEAT EJECTION CONTROL SYSTEM
Filed June 28, 1961
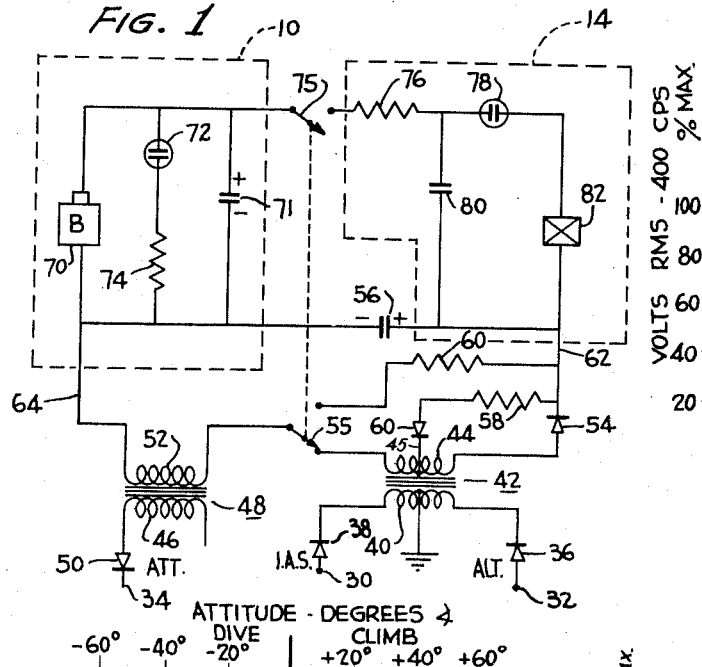
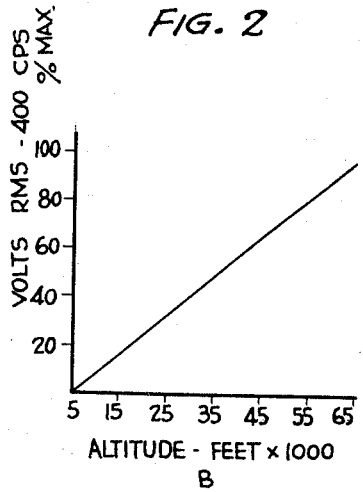
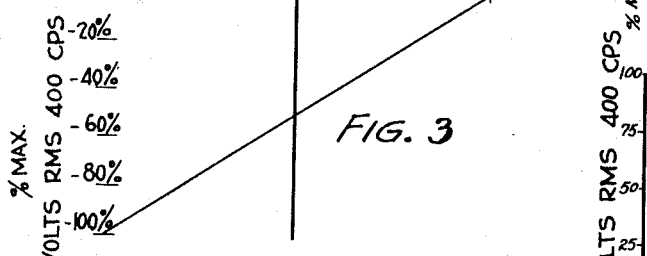
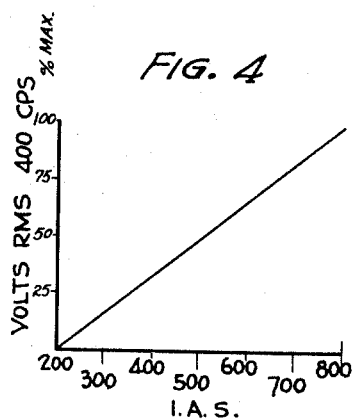
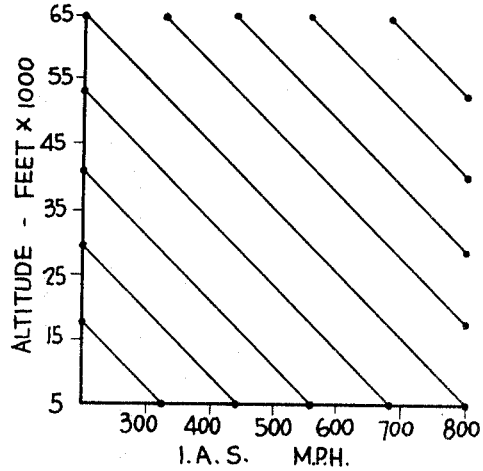
INVENTOR
JEREMIAH E. LANGAN
BY Watson, Cole, Grindle & Watson
ATTORNEYS

United States Patent Office 3,193,748
Patented July 6, 1965

3,193,748
PILOT SEAT EJECTION CONTROL SYSTEM
Jeremiah E. Langan, Cresskill, N.J., assignor to
Leesona Corporation, Cranston, R.I., a corporation
of Massachusetts
Filed June 28, 1961, Ser. No. 120,292
2 Claims. (Cl. 320—1)

This invention relates to an electrical time control system and more particularly to an electrical time control system, the timing of which is responsive to a combination of electrical signals.

In the event of an emergency in small combat-type aircraft, it is necessary for the pilot to be ejected from the plane. With high-speed aircraft the problem of safely ejecting the pilot is much more serious than in slower types of aircraft.

The pilot recovery system for a high speed combat-type aircraft should proceed through a sequence of four events as follows:

(1) The pilot presses an escape button to ignite an explosive charge in a special chamber beneath his seat. Both he and his seat are instantly propelled clear of the aircraft and remain in free fall until the next event occurs. During this initial stage of descent he may not be conscious and incapable of controlling these events. However, he is firmly secured in his seat by special fasteners about the legs and shoulders. He is moving at a very high velocity in a trajectory that will take him both forward and downward.

(2) At some predetermined time after the instant of ejection a drag-chute secured to his seat will open and reduce his forward component of velocity. The device in question (which is mounted on the seat) is designed to perform this second event only, since no major problem is associated with the following events.

(3) At some time after the second event some other device will operate to release his shoulder and leg harness and simultaneously inflate a separation bladder and push the pilot out of his seat. His rate of free fall will now be much greater than that of the seat and associated drag-chute.

(4) At some fixed time after separation from the seat, his own parachute will open and complete his descent to the earth.

The major problem in this sequence is concerned with the time interval that begins at the instant of ejection and terminates by releasing the drag-chute. This interval must be automatically controlled by the altitude, attitude and velocity of the disabled aircraft at the instant of ejection. One extreme set of conditions would be low altitude, high velocity and steep angle of dive. Obviously the drag-chute must be released very rapidly after ejection in order to provide sufficient time for the two remaining events. The opposite extreme would require very high altitude, high velocity and steep angle of climb. It is extremely hazardous to expose the pilot to the low oxygen, low pressure and low temperature conditions that prevail at very high altitudes. He will suffer no permanent ill effects unless exposed to this environment for an extended period of time. The only available solution for this problem is to get him down to a more hospitable atmosphere as quickly as possible. This obviously requires a free, un-impeded fall through many tens of thousands of feet before releasing the drag-chute. The time interval required for this extreme condition will be many times greater than that for the opposite extreme. All of the many possible combinations of the three variables between these extremes will require a proportionally adjusted interval.

During normal flight the information concerning the three variables is received from suitable transducers and stored in the form of an electric signal within the device. This signal will constantly change or follow any changes in the variables during the entire flight. At the instant of ejection the device will be separated from the transducers. The timing interval of the device is determined by the quantity of electrical energy in the stored signal. Therefore, the last signal stored before separation will determine the timing interval.

It is an object of this invention to provide a control system responsive to a combination of several electrical signals.

It is another object of this invention to provide an electrically controlled timing system responsive to a combination of several electrical signals, each of which vary in accordance with a physical variable which they indicate.

It is another object of this invention to provide a controlled timing system which is simple in construction, reliable in operation and is accurate within a very narrow margin of time over a wide ambient temperature range.

Briefly, in accordance with aspects of this invention, three signals are developed by suitable electrical transducers which exhibit linear responses over the desired range of control. The signals from these transducers are combined in a time control circuit and applied to a timing circuit in such a manner that the duration of the timing operation is determined by the resultant of the three signals. After the timing circuit has completed its time-out function, it actuates a suitable primer. The primer actuates a release mechanism to open a drag-chute secured to the pilot's seat and arrest the rate of descent.

In accordance with other aspects of this invention, a novel signal combining circuit is employed to combine the three linearly variable electrical signals indicative of attitude, altitude and indicated air speed. Advantageously, the signal indicative of indicated air speed and the signal indicative of altitude are combined in polarity opposition in the primary winding of a single transformer. The signal indicative of attitude is applied through a separate transformer to the circuit. The resultant of these three signals is employed to apply a charge to a storage capacitor. The storage capacitor is provided with a discharge circuit which permits the charge on the capacitor to decay over an extended period of time in comparison with the applied pulses of the resultant signal. Accordingly, the charge on this storage capacitor at any given instant is indicative of the magnitude of the resultant of these three signals.

In accordance with still other aspects of this invention, the storage capacitor is connected across a timing circuit when the pilot actuates his eject button. The timing circuit then begins to time the delay interval for a period determined by the time constants of the timing circuit and the resultant of the three electrical signals. At the end of the time-out period, a primer is actuated which releases the drag-chute mechanism.

These and various other objects and features of this invention will be more clearly understood from a reading of the detailed description of the invention in conjunction with the drawings, on which:

FIGURE 1 is a schematic diagram of one illustrative embodiment of this invention;

FIGURES 2, 3 and 4 are graphical plots of the electrical response of the altitude, attitude and indicated air speed responsive transducers, respectively; and FIGURE 5 is a graphical representation of the combination of electrical signals indicative of indicated air speed and altitude over the range of operation of the system.

Referring now the the schematic diagram of FIGURE 1, there is depicted the electrical control system of one illustrative embodiment of this invention. The time control system includes three input terminals 30, 32 and 34, respectively. Each of these input terminals are connected to a respective transducer (not shown) which delivers an electrical signal which varies linearly with the physical variable to which it responds. Input terminals 30 and 32 receive signals indicative of altitude and indicated air speed, respectively, while terminals 34 receive signals indicative of the attitude of the aircraft. A pair of rectifiers 36 and 38 are serially connected to terminals 32 and 30, respectively, to permit the application of signals of only one polarity to the primary winding 40 of the transformer 42. It will be apparent that assuming zero attitude signal, the remaining two signals are in polarity opposition when applied to opposite terminals of the same primary winding and, accordingly, the percentage of output voltage appearing across the secondary winding 44 may be determined from the proportional relationship of the altitude and speed signals resulting from the algebraic difference of the signal as represented by the family of loci, shown in FIGURE 5.

The signals employed in the input terminals are 400 cycles-per-second signals, the percentage of maximum R.M.S. voltage of which varies linearly with the altitude and indicated air speed, as shown in FIGURES 2 and 4, respectively. Although the altitude in thousands of feet is plotted only from the range of 5 to 65 and the indicated air speed is plotted only between the speeds of 200 and 800 per hour, it is to be understood that these are merely exemplary values and that the transducers are employed will be a matter of choice, dependent upon the capabilities of the particular aircraft. The percentage of maximum signal applied to terminal 34 varies linearly in accordance with the attitude of the aircraft, as indicated in FIGURE 3. The voltage employed is negative in polarity and varies for values of attitude of +60° (climb) to −60° (dive). Here again, the range is merely a matter of choice and may be modified by any one skilled in the art.

The attitude signal is applied to the primary winding 46 of transformer 48 through a diode 50. The secondary 52 of transformer 48 is connected through a diode 54, a switch 55 and a storage capacitor 56 to the secondary 44 of transformer 42. One side of the secondary winding 52 is connected to the center tap 45 of the transformer 42 through a resistor 58 and a diode 61 to provide a discharge path for the storage capacitor 56. The resultant of these three signals indicative of altitude, air speed and attitude maintains a charge on capacitor 56, which charge is indicative of the instantaneous resultant of these three signals. The circuit enclosed in the dotted line blocks 10 and 14 corresponds to the circuits of the Langan Patent 2,972,112. The element 70 is a nuclear battery serving as a constant current source to charge the capacitor 71 at a constant rate. Diode 72 and resistor 74 regulate the voltage across capacitor 71. A signal or external control potential may be placed upon capacitor 56. Thus when ganged switch 75 and 55 is closed, both capacitors 56 and 71 tend to store a charge on capacitor 80 through resistance 76 until it reaches the potential of break down of diode 78 to cause current flow through the load circuit 82.

When the pilot senses an emergency condition and actuates the switches 55 and 75, the capacitor 71 discharges through resistor 76 into capacitor 80 until capacitor 80 reaches the breakdown voltage for diode 78. When diode 78 conducts, capacitor 80 discharges into primer 82, actuating the primer mechanism, releasing the drag chute.

The time delay of this system is controlled by the electrical size of capacitor 71, resistor 76, capacitor 80, the ignition voltages of diodes 72 and 78, and most important, the voltage on capacitor 56. For example, time delays from milliseconds to 45 seconds can easily be met employing this circuit. The accuracy of this type time delay can be easily held within ±5% over a wide temperature range such as from −80° F. to +165° F.

Advantageously, this system exhibits sensitivity, stability and speed of response and is particularly advantageous because of the few parts employed, the simplicity of construction and the high degree of reliability.

While I have shown and described one illustrative embodiment of this invention, it is understood that the principles thereof can be applied to various other embodiments without departing from the spirit and scope of the invention. For example, these principles may be employed to combine a large number of electrical signals. Further, these principles may be employed to produce a variable time delay circuit, the delay of which is determined by the resultant of a combination of electrical signals.

What is claimed is:

1. An electrical variable time control system comprising an energy storage circuit including a storage capacitor, a discharge circuit having a predetermined time constant, means for discharging said capacitor through said discharge circuit, a plurality of input signals and means for combining said input signals into a resultant signal and applying said resultant signal to said discharge circuit while actuating said means for discharging said capacitor whereby the operating time of said system is determined by the time constant of said discharge circuit and said resultant signal, wherein said means for combining said plurality of input signals comprises a rectifier and a first transformer having a primary and secondary winding, said storage capacitor being connected in a series circuit including said secondary winding and said rectifier, and further including a second rectifier and a resistor serially connected between said secondary winding and one terminal of said first mentioned rectifier to define a decay path for said capacitor.

2. The system according to claim 1 further including a second transformer means having a primary and secondary winding, said last-mentioned secondary winding being serially connected with said first-mentioned secondary winding, the primary winding of each of said transformer means have unilateral impedance elements therein to determine the polarity of the voltage applied to said primary windings.

References Cited by the Examiner
UNITED STATES PATENTS

| | | | |
|---|---|---|---|
| 2,972,112 | 2/61 | Langan | 320—1 X |
| 2,997,694 | 8/61 | Thompson | 320—1 X |
| 3,105,170 | 9/63 | Palmer | 320—1 X |
| 3,139,530 | 6/64 | Motte | 307—75 |

IRVING L. SRAGOW, *Primary Examiner.*